US012679584B1

(12) United States Patent
McMullen et al.

(10) Patent No.: US 12,679,584 B1
(45) Date of Patent: Jul. 14, 2026

(54) ROLLER TRAY FOR USE IN A HARVESTER WRAP FILM FEEDING ASSEMBLY

(71) Applicant: CNH Industrial America LLC, New Holland, PA (US)

(72) Inventors: Malachi Spencer McMullen, Birdsboro, PA (US); Daniel Dallman, Eldridge, IA (US); Francisco Rivera, Leola, PA (US); Jordan Beckhusen, McGregor, TX (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 0 days.

(21) Appl. No.: 19/255,013

(22) Filed: Jun. 30, 2025

(51) Int. Cl.
| | |
|---|---|
| *B65B 41/16* | (2006.01) |
| *A01F 15/08* | (2006.01) |
| *B65B 11/04* | (2006.01) |
| *A01F 15/07* | (2006.01) |

(52) U.S. Cl.
CPC .............. *B65B 41/16* (2013.01); *A01F 15/08* (2013.01); *B65B 11/04* (2013.01); *A01F 15/0715* (2013.01)

(58) Field of Classification Search
None
See application file for complete search history.

(56) References Cited

U.S. PATENT DOCUMENTS

| | | | | |
|---|---|---|---|---|
| 3,150,474 | A * | 9/1964 | McVicker | B65B 41/16 |
| | | | | 53/223 |
| 3,478,486 | A * | 11/1969 | Treiber | B65B 41/16 |
| | | | | 226/110 |
| 3,914,926 | A * | 10/1975 | Braunberger | A01F 15/07 |
| | | | | 100/88 |
| 4,520,721 | A * | 6/1985 | DeCoene | A01F 15/07 |
| | | | | 100/88 |
| 5,916,109 | A * | 6/1999 | Espinosa | B65B 25/14 |
| | | | | 53/399 |
| 10,609,868 | B2 | 4/2020 | Hummel et al. | |
| 2020/0093067 | A1* | 3/2020 | Monteyne | A01F 15/0715 |
| 2023/0403982 | A1* | 12/2023 | Geesey | A01F 15/0715 |
| 2025/0031628 | A1* | 1/2025 | Wigdahl | A01F 15/0715 |

* cited by examiner

*Primary Examiner* — Tanzim Imam
(74) *Attorney, Agent, or Firm* — Fletcher Yoder, P.C.

(57) ABSTRACT

A wrapping system includes a frame, a drive roller rotatably coupled to the frame, a conveyor belt, and a roller tray disposed above the conveyor belt downstream from the drive roller. The roller tray includes a bracket pivotally coupled to the frame, one or more bracket rollers rotatably coupled to the bracket, and one or more hold down strips attached to and extending downstream from the bracket. The roller tray and the conveyor belt are configured to direct to a wrap film from the drive roller toward a bale.

20 Claims, 7 Drawing Sheets

ROLLER TRAY FOR USE IN A HARVESTER WRAP FILM FEEDING ASSEMBLY

BACKGROUND

The present disclosure relates generally to the use of a roller tray in a harvester wrap film feeding assembly.

Agricultural harvesters are used to harvest agricultural products (e.g., cotton or other natural material(s)). For example, an agricultural harvester may include a header having row units configured to harvest the agricultural product from a field. The agricultural harvester may also include an air-assisted conveying system configured to move the agricultural product from the row units to an accumulator assembly. The agricultural product may then be fed into a baler via a conveying system. The baler may compress the agricultural product into a package to facilitate storage, transport, and handling of the agricultural product. For example, a round baler may compress the agricultural product into a round bale within a baling chamber, such that the round bale has a desired size and density. After forming the bale, the bale may be wrapped with a wrap film to secure the agricultural product within the bale and to generally maintain the shape of the bale.

SUMMARY

In certain embodiments, a wrapping system includes a frame, a drive roller rotatably coupled to the frame, a conveyor belt, and a roller tray disposed above the conveyor belt downstream from the drive roller. The roller tray includes a bracket pivotally coupled to the frame, one or more bracket rollers rotatably coupled to the bracket, and one or more hold down strips attached to and extending downstream from the bracket. The roller tray and the conveyor belt are configured to direct to a wrap film from the drive roller toward a bale.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
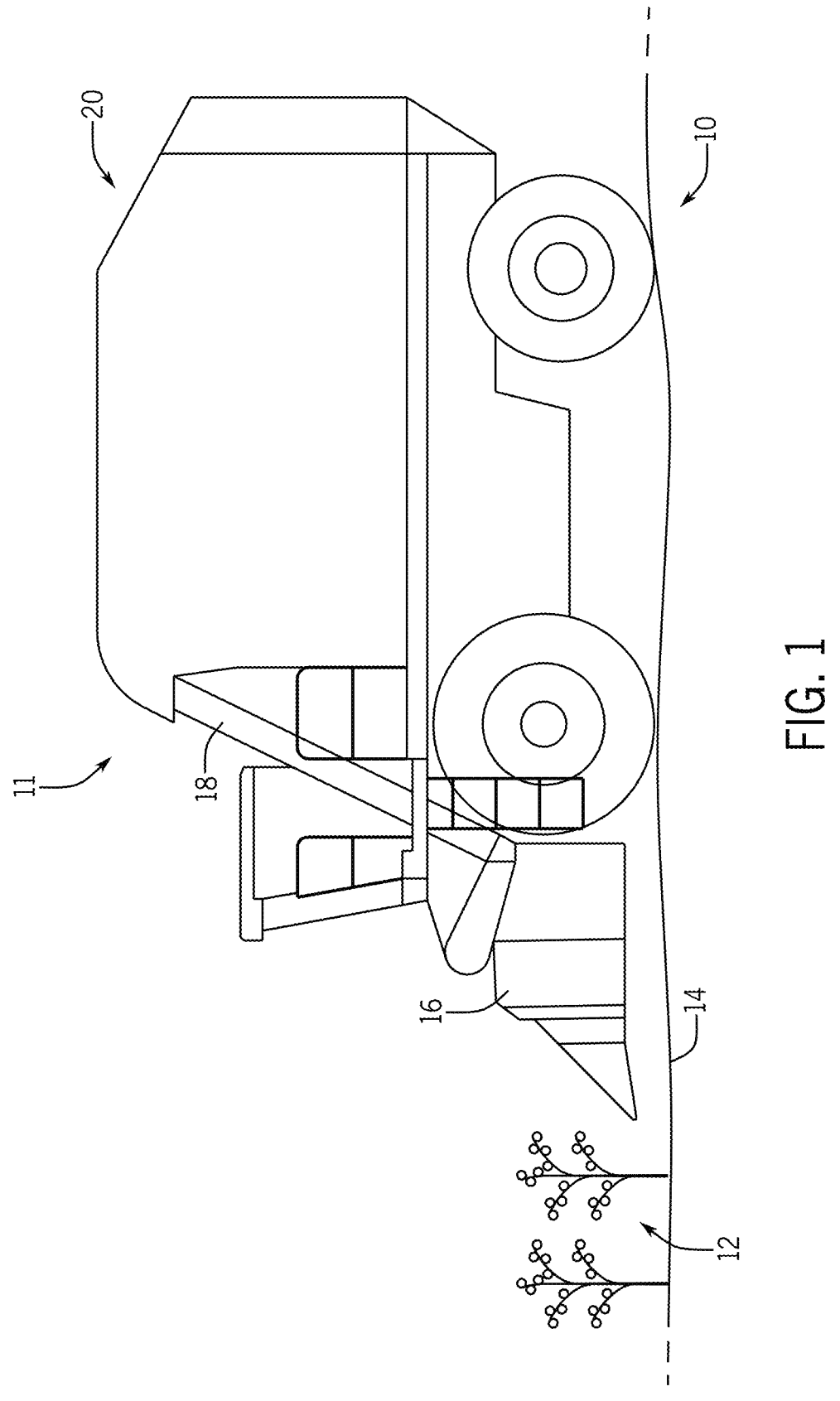
FIG. 1 is a side view of an embodiment of an agricultural machine system having an agricultural product transport assembly and a baler.

FIG. 1 is a side view of an embodiment of an agricultural machine system 10 (e.g., harvester, agricultural harvester) having an agricultural product transport assembly 11 and a baler. The agricultural machine system 10 is configured to harvest agricultural product 12 (e.g., cotton) from a field 14 and to form the agricultural product 12 into bales (e.g., agricultural bales). In the illustrated embodiment, the agricultural machine system 10 includes a header 16 having drums configured to harvest the agricultural product 12 from the field 14. Additionally, the agricultural product transport assembly 11 of the agricultural machine system 10 includes an air-assisted conveying system 18 configured to move the agricultural product 12 from the drums of the header 16 to an accumulator assembly of the agricultural product transport assembly 11. The agricultural product transport assembly 11 also includes a conveying system configured to convey the agricultural product 12 from the accumulator assembly into the baler 20 (e.g., agricultural baler). The baler 20 is supported by and/or mounted within or on a chassis of the agricultural machine system 10. The baler 20 may form the agricultural product 12 into round bales. However, in other embodiments, the baler 20 of the agricultural machine system 10 may form the agricultural product into square bales, polygonal bales, or bales of other suitable shape(s). After forming the agricultural product 12 into a bale, a bale wrapping system of the agricultural machine system 10 wraps the bale with a wrap film to secure the agricultural product 12 within the bale and to generally maintain a shape of the bale.

As discussed in detail below, the agricultural machine system 10 includes a wrap film feeding assembly configured to feed the wrap film toward the bale. The wrap film feeding assembly includes multiple feed rollers coupled to a frame. The wrap film feeding assembly also includes a film delivery tray positioned below the multiple feed rollers and configured to move with respect to a longitudinal axis of the agricultural machine system 10 from a retracted position to an extended position. A belt assembly and one or more rear hold down strips disposed above the belt assembly are coupled to the film delivery tray. In addition, the wrap film feeding assembly includes a roller tray pivotally coupled to the frame and positioned above the belt assembly. A wrap film moves between the multiple feed rollers toward the belt assembly. At the belt assembly, the wrap film is fed between a drive roller of the multiple feed rollers and the belt assembly. The wrap film is further fed between the roller tray and the belt assembly. The roller tray exerts a positive pressure on the wrap film to urge the wrap film against the belt assembly and to substantially reduce or eliminate the possibility of back-wrap. The roller tray may also guide the wrap film toward the bale and substantially reduce or eliminate bunching. Additionally, as the wrap film proceeds along the belt assembly, the rear hold down strips may guide the wrap film toward the bale.

Figure 2:
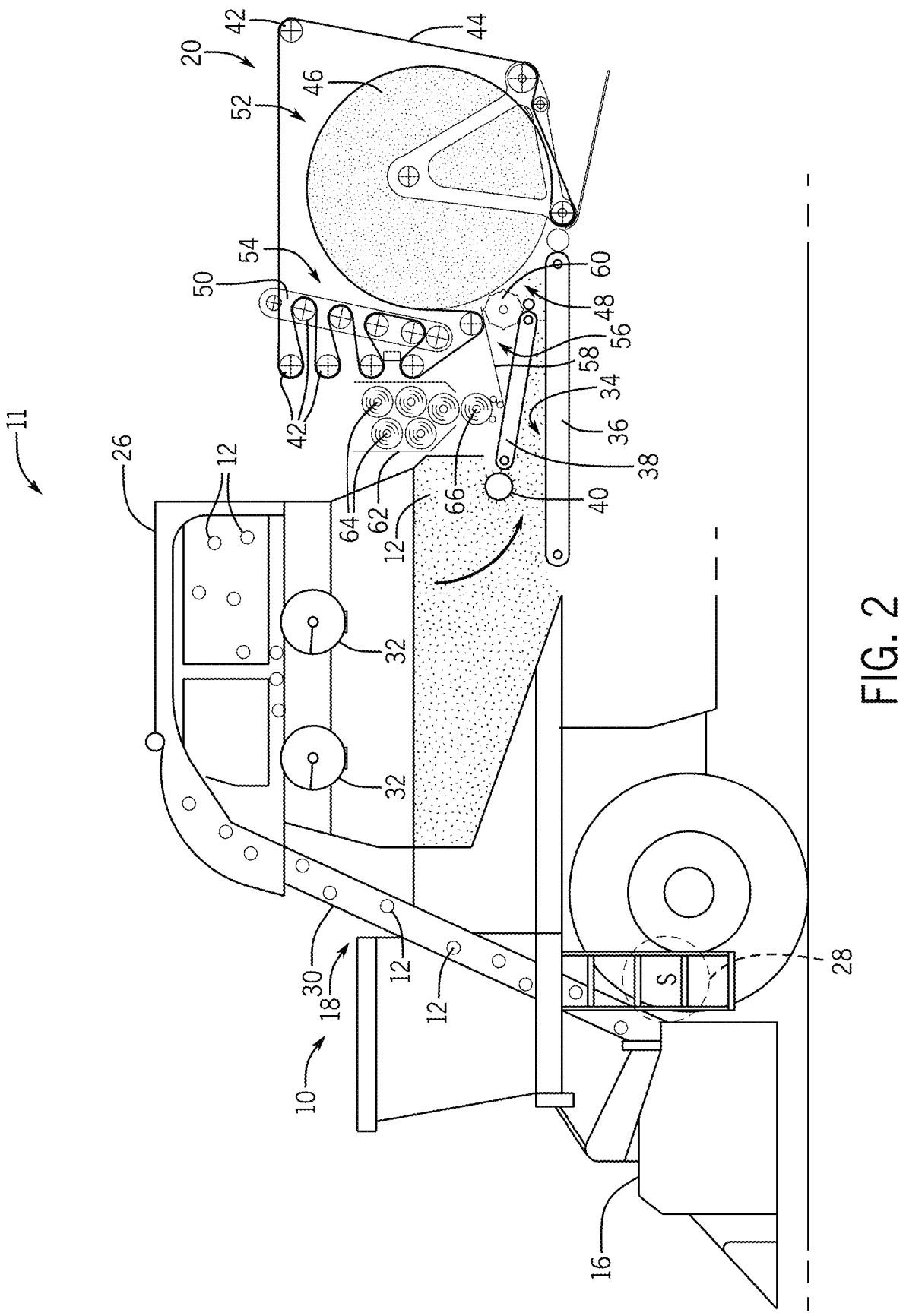
FIG. 2 is a schematic view of an embodiment of an agricultural product transport assembly and an embodiment of a baler that may be employed within the agricultural machine system of FIG. 1.

FIG. 2 is a schematic view of an embodiment of an agricultural product transport assembly 11 and an embodiment of a baler 20 that may be employed within the agricultural machine system 10 of FIG. 1. As previously discussed, the header 16 of the agricultural machine system 10 includes drums configured to harvest the agricultural product 12 (e.g., cotton) from the field. Furthermore, the air-assisted conveying system 18 is configured to move the agricultural product 12 from the drums of the header 16 to the accumulator assembly 26. In the illustrated embodiment, the air-assisted conveying system 18 includes a conveying air source 28 configured to output a conveying air flow through one or more ducts 30. Each duct 30 receives the agricultural product 12 (e.g., cotton) from the header 16, and the conveying air flow output by the conveying air source 28 drives the agricultural product to move through the duct(s) 30 from the header 16 to the accumulator assembly 26. In the illustrated embodiment, the agricultural product transport assembly 11 includes augers 32 configured to distribute the agricultural product 12 (e.g., cotton) laterally across the accumulator assembly 26 (e.g., crosswise to the downward movement of the agricultural product through the accumulator assembly). In the illustrated embodiment, the agricultural product transport assembly 11 includes two augers 32. However, in other embodiments, the agricultural product transport assembly may include more or fewer augers (e.g., 0, 1, 3, 4, or more).

In the illustrated embodiment, the conveying system 34 of the agricultural product transport assembly 11 includes a first belt (e.g., belt) 36 configured to move the agricultural product 12 from the accumulator assembly 26 to the baler 20. The first belt 36 is configured to rotate in a first rotational direction to move an agricultural product engaging surface of the first belt 36 toward the baler 20. Furthermore, in the illustrated embodiment, the conveying system 34 includes a second belt 38 positioned on an opposite side of the agricultural product 12 from the first belt 36, and the second belt 38 is configured to cooperate with the first belt 36 to move the agricultural product 12 from the accumulator assembly 26 to the baler 20. Furthermore, in the illustrated embodiment, the conveying system 34 includes an agitation roller 40 positioned upstream of the second belt 38. The agitation roller 40 is configured to agitate the agricultural product 12 entering the pair of opposing belts, thereby enhancing the uniformity of the distribution of the agricultural product passing through the pair of opposing belts.

In the illustrated embodiment, the baler 20 includes multiple rollers 42 that support and/or drive rotation of one or more belts 44. For example, one or more rollers 42 engage the belt(s) 44, which enable the belt(s) 44 to move along the pathway defined by the rollers 42 and the bale 46. One or more rollers 42 are driven to rotate via a belt drive system (e.g., including electric motor(s), hydraulic motor(s), pneumatic motor(s), etc.). The belt(s) 44 circulate around the pathway defined by the rollers 42 and the bale 46. Movement of the belt(s) 44 captures agricultural product 12 from the conveying system 34 and draws the agricultural product 12 into a cavity 48, where the agricultural product 12 is gradually built up to form the bale 46.

In the illustrated embodiment, the baler 20 includes a tension arm 50 configured to establish tension within the belt(s) 44. As the agricultural product 12 builds within the cavity 48, the agricultural product 12 applies a force to the belt(s) 44 that urges a first portion 52 of the belt(s) 44 surrounding the bale 46 to expand. Concurrently, the size of a second portion 54 (e.g., serpentine portion) of the belt(s) 44 is reduced. Accordingly, the second portion 54 of the belt(s) 44 provides the increasing belt length for the expanding first portion 52. In the illustrated embodiment, the second portion 54 of the belt(s) 44 is established by fixed rollers 42 (e.g., rollers fixed to a housing/frame of the baler 20) and rollers 42 coupled to the tension arm 50, which is pivotable relative to the fixed rollers 42 (e.g., relative to the housing/frame of the baler 20). Accordingly, as the agricultural product 12 builds within the cavity 48, the tension arm 50 is driven to rotate, thereby reducing the size of the second portion 54 and enabling the first portion 52 to expand.

Once the bale 46 reaches a desired size, a bale wrapping system 56 wraps the bale 46 with a wrap film 58 to secure the agricultural product within the bale 46 and to generally maintain a shape of the bale 46, such as the round shape in the illustrated embodiment. In other embodiments, the shape of the bale may be rectangular, polygonal, or another suitable shape. The wrap film 58 may be fed into contact with the bale 46 using one or more feed rollers. The feed rollers drive the wrap film 58 toward a starter roller 60. The starter roller 60 is configured to rotate to drive the wrap film 58 into contact with the bale 46. The wrap film 58 is captured between the bale 46 and the belt(s) 44. Accordingly, rotation of the bale 46 draws the wrap film 58 around the bale 46, thereby wrapping the bale 46. After the bale 46 is wrapped, the bale 46 is ejected from the baler 20, and the process of forming a subsequent bale may be initiated.

In certain embodiments, during the harvesting process, the conveying system 34 and the baler 20 may be periodically activated to transfer the agricultural product 12 from the accumulator assembly 26 to the baler 20 and to form the bale 46. For example, as the agricultural machine system 10 traverses a field, the agricultural product 12 may accumulate within the accumulator assembly 26. After a selected duration, the conveying system 34 may be activated to transfer the agricultural product 12 from the accumulator assembly 26 to the baler 20. For example, the conveying system 34 may move the agricultural product 12 toward the baler 20 at a significantly faster rate than the air-assisted conveying system 18 moves the agricultural product 12 into the accumulator assembly 26. Concurrently with activation of the conveying system 34, the baler 20 may be activated to initiate the bale forming process, as described above. After another selected duration, the conveying system 34 and the baler 20 may be deactivated to enable the accumulator assembly 26 to collect additional agricultural product 12. In certain embodiments, the conveying system 34 and the baler 20 may be activated four or five times to enable the bale 46 to reach the desired size. As previously discussed, once the bale reaches the desired size, the bale wrapping system 56 wraps the bale 46 with the wrap film 58. Because the conveying system 34 and the baler 20 are periodically activated, the agricultural machine system 10 may utilize less energy during the harvesting process (e.g., as compared to continuously operating the conveying system and the baler).

In the illustrated embodiment, the agricultural machine system 10 includes a wrap film assembly storage compartment 62 configured to store multiple wrap film assemblies 64. In certain embodiments, each wrap film assembly 64 includes a shaft and a wrap film disposed about the shaft to form a roll of the wrap film. However, in other embodiments, the shaft may be omitted, and the wrap film may be arranged in a roll (e.g., with a hollow region at the center).

Furthermore, the agricultural machine system 10 (e.g., the bale wrapping system 56 of the agricultural machine system 10) includes a wrap film feeding assembly configured to receive an active wrap film assembly 66 from the wrap film assembly storage compartment 62 and to feed the wrap film 58 of the active wrap film assembly 66 toward the bale 46 (e.g., toward the starter roller 60). The wrap film feeding assembly includes multiple feed rollers, a belt assembly, and a roller tray. The multiple feed rollers may be configured to direct the wrap film 58 from the active wrap film assembly 66 to the belt assembly. The roller tray may be disposed above the belt assembly and disposed behind a drive roller of the multiple feed rollers. As wrap film 58 proceeds along the belt assembly, the roller tray may exert a positive pressure on the wrap film 58 to substantially reduce or eliminate back-wrapping of the wrap film 58. The roller tray may also guide the wrap film 58 along the belt assembly toward the bale 46 to substantially reduce or eliminate bunching of the wrap film 58.

Figure 3:
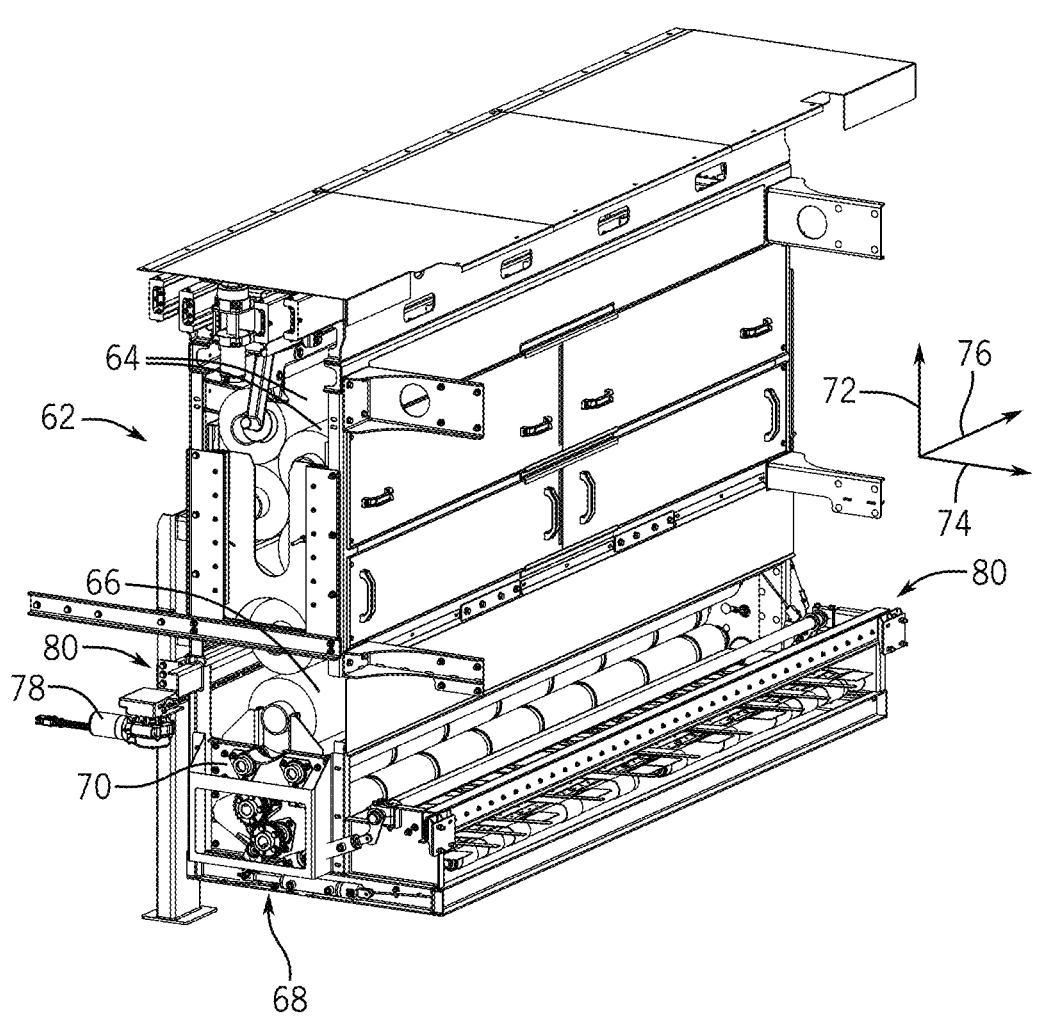
FIG. 3 is a perspective view of an embodiment of a wrap film feeding assembly that may be employed within the agricultural machine system of FIG. 1, in which a frame of the wrap film feeding assembly is in a retracted position.

FIG. 3 is a perspective view of an embodiment of a wrap film feeding assembly 68 that may be employed within the agricultural machine system of FIG. 1, in which a frame 70 of the wrap film feeding assembly 68 is in a retracted position. As previously discussed, the wrap film assembly storage compartment 62 is configured to store multiple wrap film assemblies 64. In addition, while the frame 70 is in the illustrated retracted position, the wrap film feeding assembly 68 is configured to feed the wrap film of the active wrap film assembly 66 toward the bale with respect to a longitudinal axis 74 of the agricultural machine system. While the wrap film feeding assembly 68 is configured to receive the active wrap film assembly 66 from the wrap film assembly storage compartment 62 in the illustrated embodiment, in other embodiments, the wrap film assembly storage compartment may be omitted. In such embodiments, the active wrap film assembly may be loaded into the wrap film feeding assembly manually (e.g., while the frame is in an extended position).

In certain embodiments, the frame 70 is configured to move with respect to a lateral axis 76 between the illustrated retracted position and the extended position. With the frame 70 in the extended position, the wrap film of the active wrap film assembly 66 may be loaded through the feed rollers of the wrap film feeding assembly 68. In the illustrated embodiment, the wrap film feeding assembly 68 includes a motor 78 (e.g., frame drive motor) configured to drive the frame 70 to move between the illustrated retracted position and the extended position. The motor 78 may include an electric motor, a pneumatic motor, a hydraulic motor, another suitable type of motor, or a combination thereof. In certain embodiments, a track is coupled to the frame, a gear is coupled to a shaft of the motor, and the gear is engaged with the track. The motor is configured to drive the gear to rotate, thereby driving the frame to move with respect to the lateral axis. However, in other embodiments, another suitable mechanism (e.g., screw drive, etc.) may enable the motor to drive the frame to move with respect to the lateral axis. Furthermore, in certain embodiments, the wrap film feeding assembly may include another suitable actuator (e.g., electric linear actuator, hydraulic cylinder, pneumatic cylinder, etc.) configured to drive the frame to move with respect to the lateral axis. In addition, in certain embodiments, the wrap film feeding assembly may not include any device (e.g., motor, actuator, etc.) configured to drive the frame to move between the retracted and extended positions. In such embodiments, an operator may manually move the frame with respect to the lateral axis between the retracted and extended positions.

In the illustrated embodiment, the wrap film feeding assembly 68 includes track assemblies 80 configured to guide the frame 70 to move with respect to the lateral axis 76 between the retracted position and the extended position. In the illustrated embodiment, the wrap film feeding assembly 68 includes two track assemblies 80 positioned on opposite longitudinal sides of the frame 70. However, in other embodiments, the wrap film feeding assembly may include more or fewer track assemblies (e.g., 1, 3, 4, or more), and each track assembly may be positioned at any suitable location on the frame. In addition, while the wrap film feeding assembly 68 includes track assemblies 80 in the illustrated embodiment, in other embodiments, the wrap film feeding assembly may include any other suitable assemblies (e.g., alone or in combination with the track assembly/ assemblies) to guide movement of the frame with respect to the lateral axis, such as one or more slot and groove assemblies, one or more protrusion and recess assemblies, etc.

Figure 4:
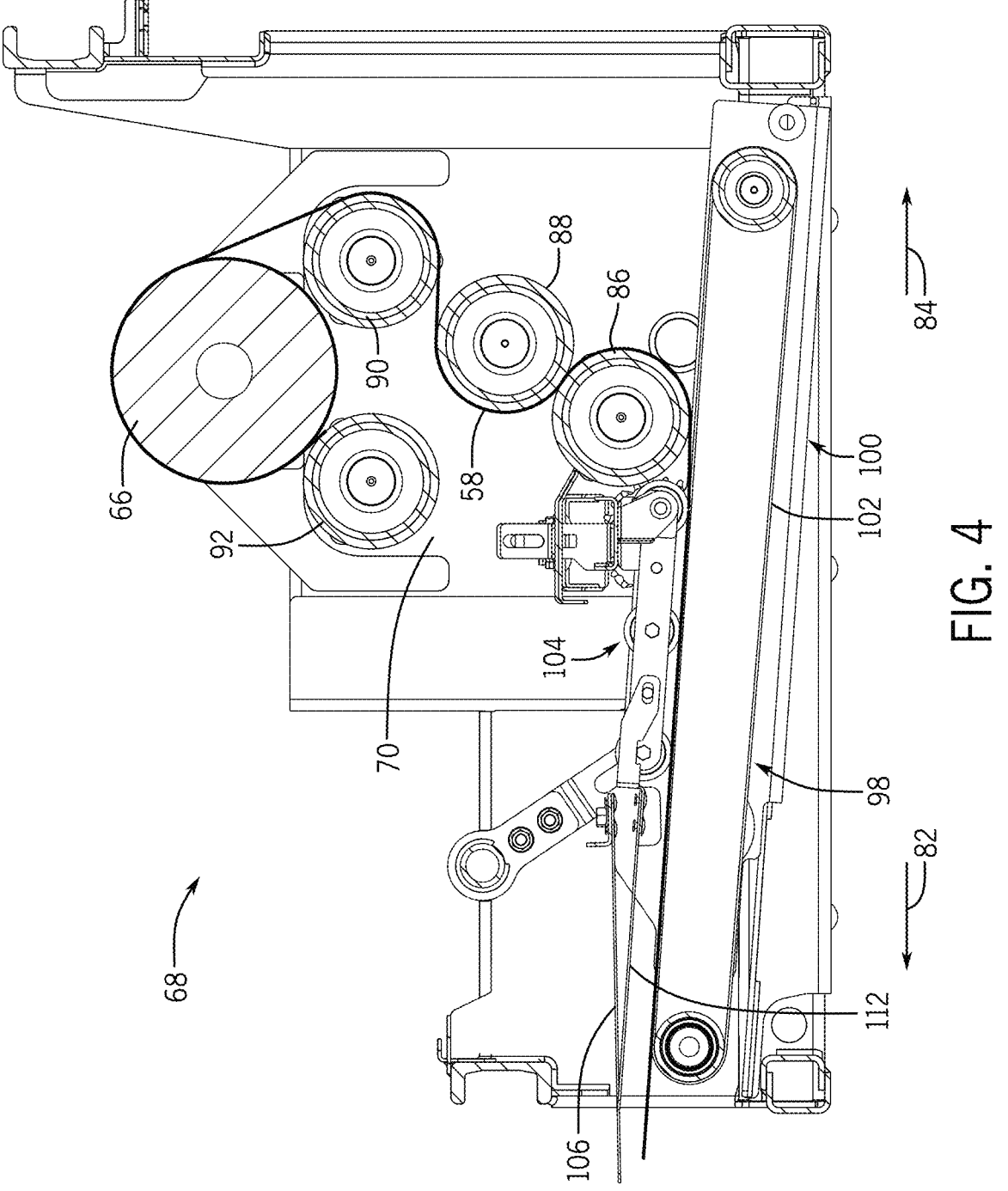
FIG. 4 is a cross-sectional view of a portion of the wrap film feeding assembly of FIG. 3.

FIG. 4 is a cross-sectional view of a portion of the wrap film feeding assembly 68 of FIG. 3. The wrap film feeding assembly is configured to direct the wrap film 58 toward the bale (e.g., in a downstream 82 direction opposite an upstream 84 direction). In the illustrated embodiment, the wrap film feeding assembly 68 includes multiple feed rollers. In the illustrated embodiment, the wrap film feeding assembly 68 includes a drive roller 86 (e.g., a fixed feed roller, a bottom feed roller), a middle feed roller 88, a first support roller 90, and a second support roller 92. Each support roller is rotatably and non-movably coupled to the frame 70, and the first support roller 90 and the second support roller 92 are configured to support the active wrap film assembly 66 within the wrap film feeding assembly 68. The first support roller 90, the second support roller 92, the drive roller 86, and the middle feed roller 88 are driven to rotate (e.g., by a motor) to drive the active wrap film assembly 66 to rotate and to direct the wrap film 58 along the feed rollers.

In the illustrated embodiment, the wrap film feeding assembly 68 also includes a belt assembly 98 coupled to a film delivery tray 100. The belt assembly 98 is configured to receive the wrap film 58 from the drive roller 86, such that the wrap film 58 is disposed between the drive roller 86 and the belt assembly 98. The belt assembly 98 includes one or more conveyor belts 102. In addition, the belt assembly 98 is configured to drive the wrap film 58 to move toward the bale in the downstream direction 82. The wrap film feeding assembly 68 also includes a roller tray 104 pivotably coupled to the frame 70 and configured to exert positive pressure on the wrap film 58 as the wrap film 58 moves along the belt assembly 98 to substantially reduce or eliminate bunching of the wrap film 58 (e.g., excess wrap film gathering within the wrap film feeding assembly 68) and back-wrapping of the wrap film 58 (e.g., wrapping of a portion of the wrap film downstream from the drive roller around the drive roller). The roller tray 104 may also guide the wrap film 58 toward the bale while at least a portion of the wrap film 58 is not in contact with the belt assembly 98. The wrap film feeding assembly 68 further includes one or more rear hold down strips 106 coupled to the film delivery tray 100 and disposed above the belt assembly 98. The rear hold down strips 106 extend beyond a downstream end of the belt assembly 98 and guide a portion of the wrap film 58 that is not in contact with the belt assembly 98 toward the bale. In some embodiments, the wrap film feeding assembly 68 may not include the rear hold down strips 106.

In some embodiments, the film delivery tray 100 may transition between a retracted position, as illustrated, and an extended position. Therefore, the belt assembly 98 and the rear hold down strips 106 are moveable from the retracted position to the extended position in accordance with the movement of the film delivery tray 100. In the retracted position as illustrated in FIG. 4, the belt assembly 98 may be positioned such that hold down strips 112 of the roller tray 104 extend to or beyond the downstream end of the belt assembly 98. In the extended position, the belt assembly 98 and the rear hold down strips 106 may be positioned farther downstream (e.g., in the downstream direction 82). As such, the hold down strips 112 of the roller tray 104 may not extend to or beyond the downstream end of the belt assembly 98. However, in the extended position, the rear hold down strips 106 maintain their position relative to the belt assembly 98 and, therefore, extend beyond the downstream end of the belt assembly 98. Thus, the roller tray 104 and the rear hold down strips 106 serve to guide the wrap film 58 toward the bale while the film delivery tray 100, the belt assembly 98, and the rear hold down strips 106 are in both the retracted position and the extended position.

To wrap a bale with the wrap film 58 of the active wrap film assembly 66, the first support roller 90, the second support roller 92, the middle feed roller 88, the drive roller 86, and the conveyor belt 102 are driven to rotate (e.g., by a motor), thereby feeding the wrap film 58 to the starter roller. As illustrated, the wrap film 58 may extend from the active wrap film assembly 66 along an upstream side of the first support roller 90. The wrap film 58 may be directed between a bottom side of the first support roller 90 and a top side of the middle feed roller 88. The wrap film 58 may wind around a downstream side of the middle feed roller 88. Subsequently, the wrap film 58 may be directed between the middle feed roller 88 and the drive roller 86 such that the wrap film extends along an upstream side of the drive roller 86. The wrap film 58 may be directed in the downstream direction 82 between a bottom side of the drive roller 86 and a top side of the belt(s) 102 of the belt assembly 98. As the wrap film 58 continues along the belt assembly 98, the roller tray 104, which is positioned above the wrap film 58, may exert positive pressure on the wrap film 58 to substantially reduce or eliminate back-wrapping of the wrap film 58. The roller tray 104 and the rear hold down strips 106 guide the wrap film 58 along the belt assembly 98 toward the bale and substantially reduce or eliminate bunching of the wrap film 58.

Figure 5:
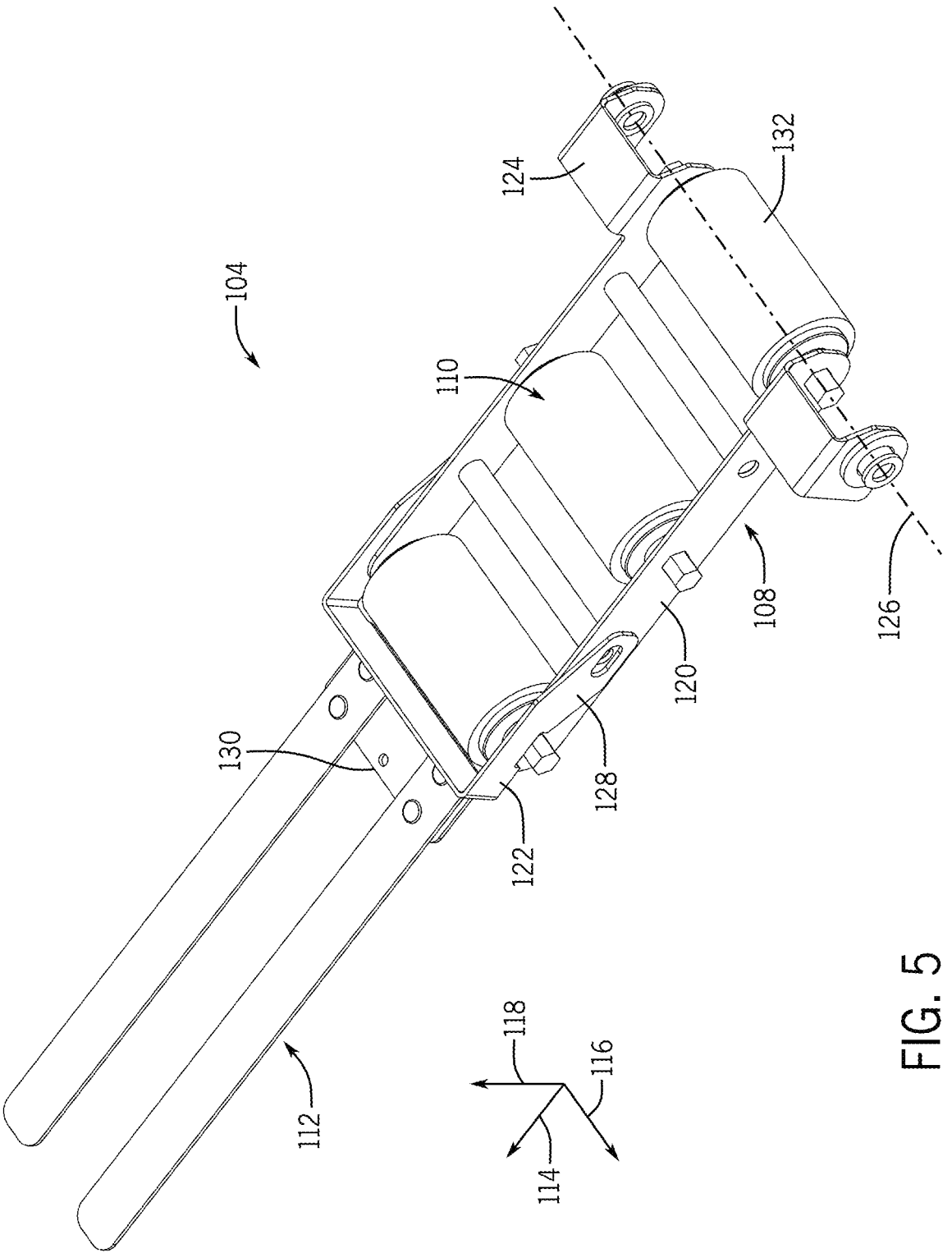
FIG. 5 is a perspective view of a roller tray of the wrap film feeding assembly of FIG. 3.

FIG. 5 is a perspective view of the roller tray 104 of FIG. 4. The roller tray 104 includes a bracket 108, one or more bracket rollers 110 rotatably coupled to the bracket 108, and one or more hold down strips 112 attached to and extending from a downstream end of the bracket 108 with respect to a longitudinal axis 114. The roller tray 104 may be formed from plastic, metal, rubber, or any combination thereof. For example, the bracket 108 and the hold down strips 112 may be formed from plastic, and the bracket rollers 110 may be formed from metal. The bracket 108 includes a body 120 and a mount 122. The body 120 may be shaped to receive the bracket rollers 110. The body may be single piece or multiple pieces. For example, in the illustrated embodiment, the body 120 includes a first piece disposed on a first lateral side of the bracket rollers 110 and a second piece disposed on a second lateral side of the bracket rollers 110. The body 120 also includes one or more arms 124. The bracket 108 pivotably attaches to the frame via a mounting bar, as described below. For example, the arms 124 may be pivotably coupled to the mounting bar such that the bracket 108 is pivotably coupled to the frame along a pivot axis 126. In the illustrated embodiment, the pivot axis 126 extends parallel to a lateral axis 116. The arms 124 may be mounted to the mounting bar, and the mounting bar may be movable along the vertical axis 118 to control the pressure exerted by the roller tray 104 on the wrap film. As mentioned above, the bracket 108 includes a mount 122. The mount 122 includes a support 128 and a shelf 130. The support 128 attaches the mount 122 to the body 120 of the bracket 108. The support 128 enables an angle of the shelf 130 to be adjusted relative to the body 120, and the shelf 130 extends downstream with respect to the longitudinal axis 114. The hold down strips 112 are coupled to the shelf 130. Accordingly, the angle of the hold down strips 112 relative to the body 120 may be adjusted via the support 128. In some embodiments, the roller tray 104 may not include a bracket 108. In such embodiments, the bracket rollers 110 and the hold down strips 112 may each be coupled to the frame.

The roller tray 104 includes one or more bracket rollers 110. In the illustrated embodiment, the roller tray 104 includes three bracket rollers 110. However, the roller tray 104 may include any suitable number of bracket rollers 110 (e.g., 1, 2, 4, 5, 6, 7, etc.). The bracket rollers 110 may each rotate about a respective rotational axis. For example, the bracket rollers 110 may rotate in response to the movement of the wrap film along the belt assembly. The bracket rollers 110 are longitudinally disposed along the body 120 of the bracket 108, the rotational axes of the bracket rollers 110 are parallel to one another, and the rotational axes of the bracket rollers 110 are disposed at different locations with respect to the longitudinal axis 114. The roller tray includes a first bracket roller 132. The first bracket roller 132 may have a rotational axis aligned (e.g., coaxial) with the pivot axis 126 of the bracket 108.

The roller tray 104 includes any suitable number of hold down strips 112. Although the roller tray 104 includes two hold down strips 112 in the illustrated embodiment of FIG. 5, the roller tray 104 may include any number of hold down strips (e.g., 0, 1, 3, 4, 5, 6, 7, etc.). In some embodiments, the roller tray 104 may not include the hold down strips 112 and/or the mount 122. Instead, the roller tray 104 may include additional bracket rollers 110. The hold down strips 112 are mounted to the shelf 130 of the mount 122. The mount 122 may be rotated about the lateral axis 116 relative to the body 120 to adjust the angle of the hold down strips 112 relative to the body 120.

Figure 6:
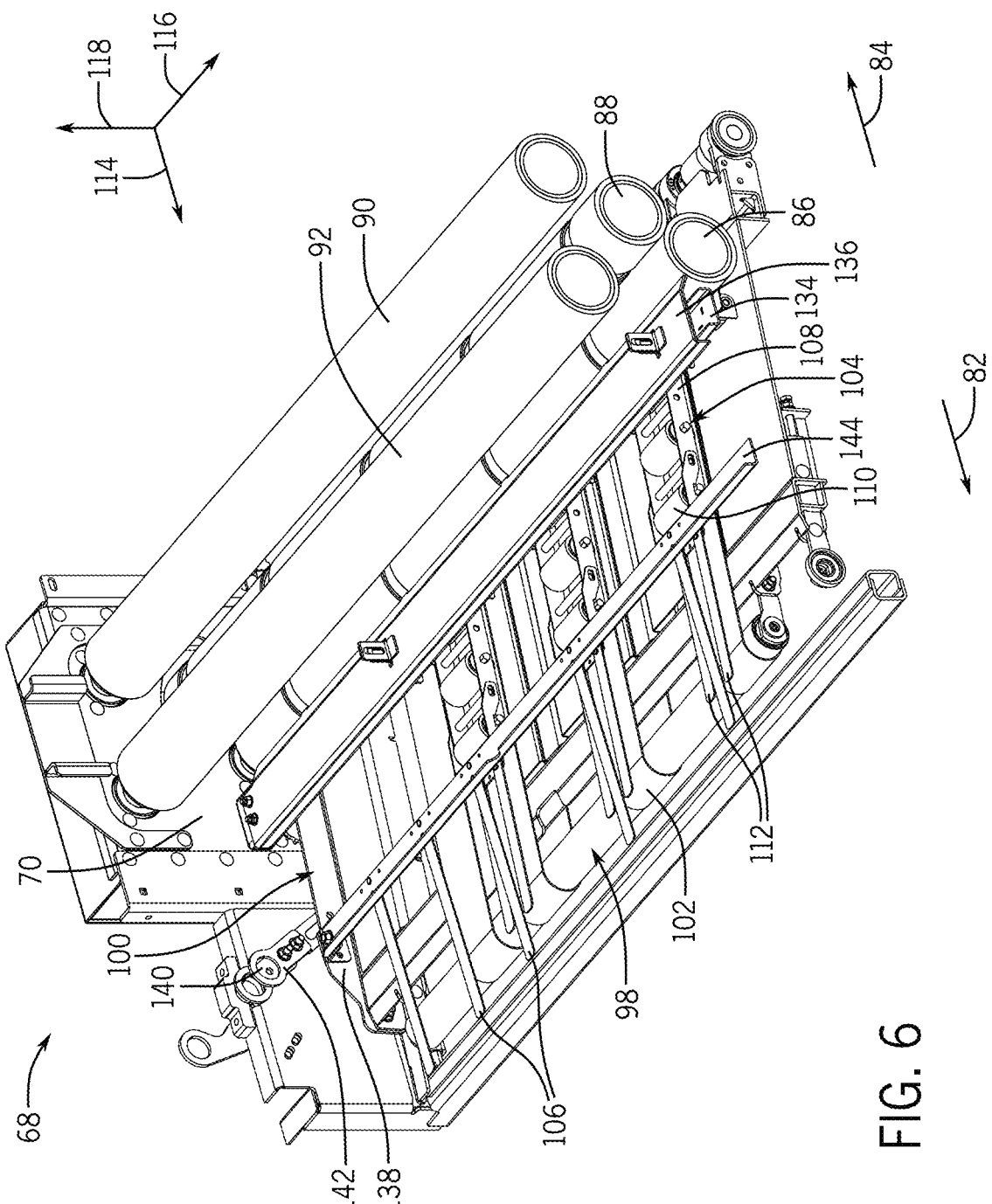
FIG. 6 is a perspective view of a portion of the wrap film feeding assembly of FIG. 3.

FIG. 6 is a perspective view of a portion of the wrap film feeding assembly 68 of FIG. 3. The wrap film feeding assembly 68 includes the frame 70, multiple feed rollers (e.g., the drive roller 86, the middle feed roller 88, the first support roller 90, and the second support roller 92) rotatably coupled to the frame 70, one or more roller trays 104 pivotably coupled to the frame 70, a film delivery tray 100 moveable relative to the frame 70, a belt assembly 98 coupled to the film delivery tray 100, and one or more rear hold down strips 106 coupled to the film delivery tray 100. Various elements of the wrap film feeding assembly 68 may be referred to with reference to the downstream direction 82 (e.g., toward the bale) and an upstream direction (e.g., away from the bale).

The frame 70 includes a first side wall and a second side wall. The multiple feed rollers, the one or more roller trays

104, the film delivery tray 100, the belt assembly 98, and the one or more rear hold down strips 106 are disposed between the first side wall and the second side wall of the frame 70.

The multiple feed rollers may include the drive roller 86, the middle feed roller 88, the first support roller 90, and the second support roller 92. Each of the multiple feed rollers is rotatably coupled to the frame 70. For example, a first end of each feed roller is rotatably coupled to the first side wall of the frame 70, and a second end of each feed roller is rotatably coupled to the second side wall of the frame 70, such that each feed roller is disposed between the first side wall and the second side wall of the frame 70.

The one or more roller trays 104 are pivotably coupled to the frame 70. In the illustrated embodiment, the bracket 108 of each roller tray 104 is pivotably coupled to a mounting bar 134. The mounting bar 134 may be mounted to any suitable structure. As illustrated, the mounting bar 134 is moveably coupled to an anti-back wrap bracket 136, such that the mounting bar 134 may move in a vertical direction to raise and lower the roller trays 104. In some embodiments, the mounting bar 134 may be fixedly coupled to the anti-back wrap bracket 136. Lowering the roller trays 104 may increase the pressure the roller trays 104 exert on the wrap film, and raising the roller trays 104 may decrease the pressure the roller trays 104 exert on the wrap film. In some embodiments, the wrap film feeding assembly 68 may include biasing member(s) (e.g., spring(s), hydraulic cylinder(s), pneumatic cylinder(s), etc.) configured to urge each roller tray downwardly to increase the pressure exerted by the bracket rollers 110 on the wrap film. The anti-back wrap bracket 136 may be fixedly coupled to the frame 70. The roller trays 104 may be positioned downstream (e.g., in the downstream direction 82) from the drive roller 86 with the bracket rollers 110 positioned at an upstream side of each roller tray 104 and with the hold down strips 112 positioned at a downstream side of each roller tray 104. As described above, the movement of the conveyor belt(s) 102 of the belt assembly 98 may cause the bracket rollers 110 of the roller trays 104 to rotate as the wrap film is directed downstream (e.g., in the downstream direction 82) toward the bale.

The film delivery tray 100 is movable from a retracted position, as illustrated, to an extended position. The film delivery tray 100 includes a chassis 138, and the wrap film feeding assembly 68 includes a rockshaft 140 and arm(s) 142 pivotally coupled to the chassis 138 and non-pivotally coupled to the rockshaft 140. The rockshaft 140 is pivotally coupled to the frame 70, and the rockshaft 140 is driven to rotate by an actuator. Track assemblies disposed along the frame 70 may be used to guide the film delivery tray 100 to move between the retracted position and the extended position. In addition, each arm 142 includes a slot, and a fastener extends through the slot of each arm, thereby pivotally coupling the arm 142 to the chassis 138. As each arm 142 is driven to rotate by the rockshaft 140, contact between the arm 142 and the respective fastener drives the film delivery tray 100 to move between the illustrated retracted position and the extended position. While track assemblies are disclosed above, in certain embodiments, other suitable assemblies (e.g., alone or in combination with the track assemblies) may guide movement of the film delivery tray 100, such as one or more slot and groove assemblies, one or more protrusion and recess assemblies, etc. Furthermore, while the film delivery tray 100 is driven to move by the rockshaft 140 and the arm(s) 142 in the illustrated embodiment, in other embodiments, the film delivery tray may be driven to move by another suitable assembly, such as a screw drive, a gear and track assembly, a linear actuator (e.g., hydraulic cylinder, etc.), etc. In other embodiments, the film delivery tray may be fixed with respect to the frame of the wrap film feeding assembly.

The belt assembly 98 is coupled to the film delivery tray 100. As such, the belt assembly 98 is moveable from the retracted position to the extended position with the film delivery tray 100. In the retracted position, as illustrated, a downstream end of the belt assembly 98 is positioned upstream of a downstream end of the frame 70. In the extended position, the downstream end of the belt assembly 98 may be positioned downstream (e.g., in the downstream direction 82) from the downstream end of the frame 70. The belt assembly 98 includes one or more conveyor belts 102. The conveyor belts 102 are driven to rotate (e.g., by a motor) to transport the wrap film toward the bale in the downstream direction 82. The belt assembly 98 is positioned such that the drive roller 86 and the bracket rollers 110 of the roller trays 104 are positioned above the conveyor belts 102 with respect to the vertical axis 118. In some embodiments, the wrap film feeding assembly 68 may include a roller tray 104 positioned above each of the one or more conveyor belts 102. In the retracted position of the belt assembly 98, a downstream end of each hold down strip 112 of each roller tray 104 is positioned downstream of the downstream end of the belt assembly 98. However, in the extended position of the belt assembly 98, the downstream end of the belt assembly 98 is positioned downstream from the downstream ends of the hold down strips 112 of the roller trays 104. Therefore, with the belt assembly 98 in the retracted position, the hold down strips 112 of the roller trays 104 guide the wrap film past the downstream end of the belt assembly 98 and substantially reduce or eliminate bunching of the wrap film. However, with the belt assembly 98 in the extended position, the hold down strips 112 of the roller trays 104 do not extend downstream from the downstream end of the belt assembly 98 and, therefore, substantially reduce or eliminate bunching along a portion of the belt assembly 98.

The one or more rear hold down strips 106 are coupled to the film delivery tray 100. In the illustrated embodiment, the rear hold down strips 106 are fixedly coupled to a support bracket 144 of the film delivery tray 100. The support bracket 144 is fixedly coupled to the chassis 138 of the film delivery tray 100, such that the support bracket 144 moves with the chassis 138. Because the rear hold down strips 106 and the belt assembly 98 are coupled to the film delivery tray 100, the position of the rear hold down strips 106 are fixed relative to the belt assembly 98. The rear hold down strips 106 are disposed above the belt assembly 98 with respect to the vertical axis 118. In some embodiments, a rear hold down strip 106 is laterally aligned with each conveyor belt 102 of the belt assembly 98. The rear hold down strips 106 may be mounted to the support bracket 144 such that the rear hold down strips 106 and the belt assembly 98 converge in the downstream direction 82. A downstream end of each rear hold down strip 106 is positioned downstream from the downstream end of the belt assembly 98. The rear hold down strips 106 are moveable with the film delivery tray 100 from the retracted position, as illustrated, to the extended position. Thus, the rear hold down strips 106 may block the wrap film from bunching and guide the wrap film in the downstream direction 82 from the downstream end of the belt assembly 98 toward the bale while the rear hold down strips 106 are in both the retracted position and the extended position.

In operation, the wrap film may be fed along the multiple feed rollers as described with respect to FIG. 4. The drive roller 86 may feed the wrap film to the conveyor belts 102 of the belt assembly 98. The conveyor belts 102 may rotate such that the wrap film is conveyed downstream toward the bale. As the wrap film proceeds toward the bale, the bracket rollers 110 of the roller trays 104 may exert positive pressure on the wrap film to substantially reduce or eliminate back-wrapping of the wrap film. The movement of the wrap film along the conveyor belts 102 may cause rotation of the bracket rollers 110. Downstream beyond the bracket rollers 110, the hold down strips 112 of the roller trays 104 may direct the wrap film along the belt assembly 98 and substantially reduce or eliminate bunching of the wrap film. The rear hold down strips 106 may also direct the wrap film 58 along the belt assembly 98 toward the bale and substantially reduce or eliminate bunching of the wrap film.

Figure 7:
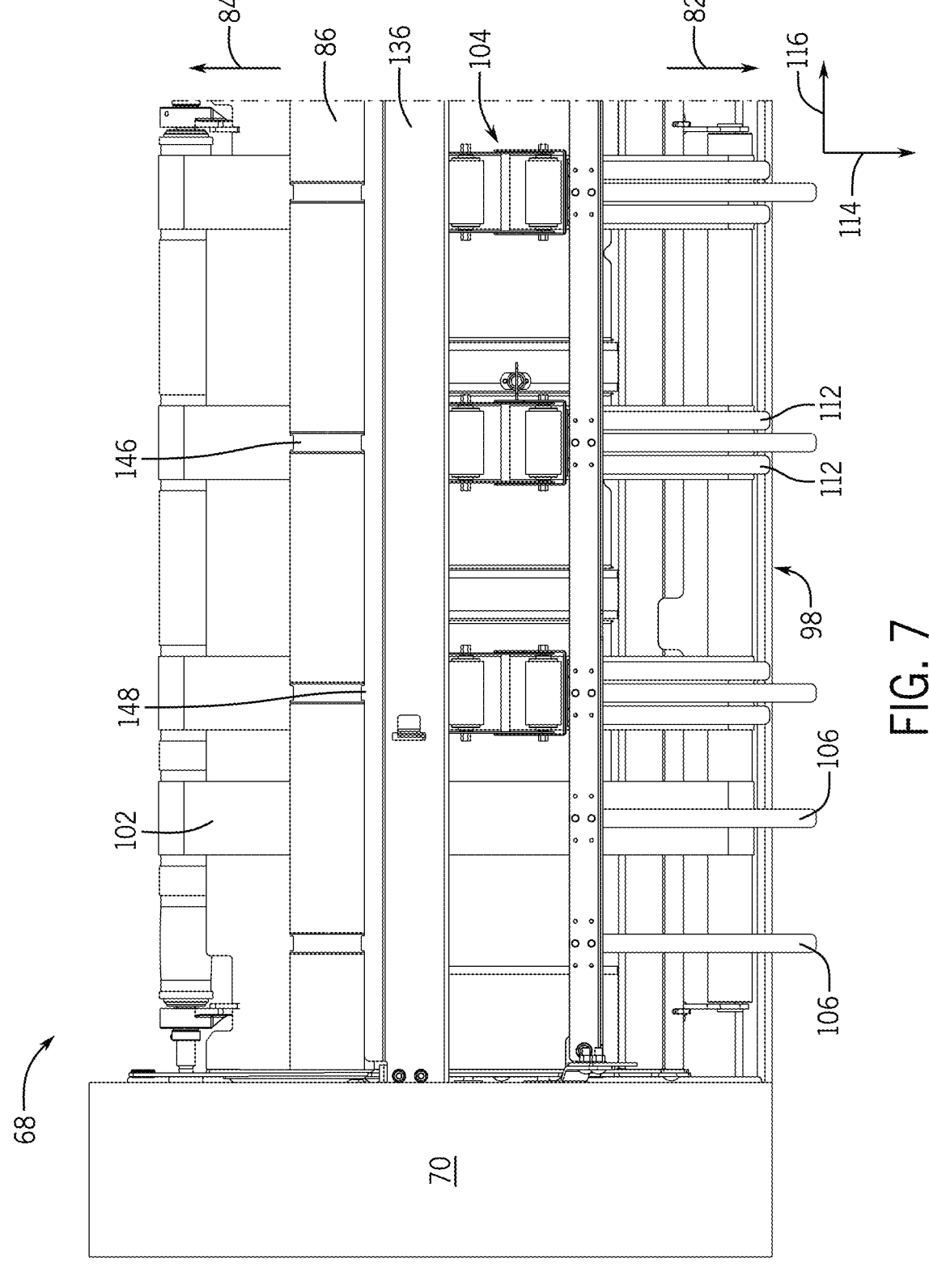
FIG. 7 is a top view of a portion of the wrap film feeding assembly of FIG. 3.

FIG. 7 is a top view of a portion of the wrap film feeding assembly 68 of FIG. 3. The wrap film feeding assembly 68 includes the frame 70, the drive roller 86 rotatably coupled to the frame 70, one or more roller trays 104 pivotably coupled to the frame 70 and disposed downstream of the drive roller 86, a belt assembly 98 including one or more conveyor belts 102, and one or more rear hold down strips 106 disposed above the belt assembly 98. Various elements of the wrap film feeding assembly 68 may be referred to with reference to the downstream direction 82 (e.g., toward the bale) and the upstream direction 84 direction (e.g., away from the bale).

The drive roller 86 and the roller trays 104 are positioned above the belt assembly 98. As described above, a roller tray 104 and at least one rear hold down strip 106 are positioned above and laterally aligned with each conveyor belt 102 (e.g., aligned with respect to the lateral axis 116). As illustrated, two hold down strips 112 of each roller tray 104 are laterally aligned with each respective conveyor belt 102 (e.g., aligned with respect to the lateral axis 116). In addition, a rear hold down strip 106 is laterally disposed between the two hold down strips 112 of each respective roller tray 104. In some embodiments, at least one rear hold down strip 106 may be positioned to laterally overlap at least one hold down strip 112. In the retracted position of the film delivery tray, as illustrated, the hold down strips 112 of the roller trays 104 and the rear hold down strips 106 extend over a common portion of the belt assembly 98, thus serving to cooperate with one another in guiding the wrap film. In the extended position of the film delivery tray, the rear hold down strips 106 may extend farther downstream than the hold down strips 112 of the roller trays 104. As such, the hold down strips 112 of the roller trays 104 may guide the wrap film along an upstream portion of the belt assembly 98, and the rear hold down strips 106 may guide the wrap film along a downstream portion of the belt assembly 98.

To substantially reduce or eliminate back-wrapping of the wrap film around the drive roller 86, the wrap film feeding assembly 68 may include the anti-back wrap bracket 136 disposed above the roller trays 104 and downstream from the drive roller 86. Back wrap occurs when a portion of the wrap film downstream from the drive roller 86 wraps around the drive roller 86, such that the wrap film accumulates around the drive roller 86 rather than proceeding along the belt assembly 98 toward the bale. The drive roller 86 may include one or more circumferential notches 146. As illustrated, the notches 146 are continuous circular notches 146 formed along an outer circumference of the drive roller 86. The anti-back wrap bracket 136 includes protrusions 148 configured to engage the notches 146 in the drive roller 86. For example, each protrusion 148 may be sized and shaped to engage a respective notch 146 such that the drive roller 86 may rotate unencumbered. The protrusions 148 of the anti-back wrap bracket 136 substantially reduce or eliminate back wrap by blocking a gap between the drive roller 86 and the anti-back wrap bracket 136 such that the wrap film is directed toward the roller trays 104 and the belt assembly 98. While the wrap film feeding assembly 68 includes the anti-back wrap bracket with notches in the illustrated embodiment, in other embodiments, the notches of the anti-back wrap bracket may be omitted, or the anti-back wrap bracket may be omitted.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wrap film feeding assembly, comprising:
   a frame;
   a drive roller rotatably coupled to the frame;
   a conveyor belt; and
   a roller tray disposed above the conveyor belt downstream from the drive roller, wherein the roller tray comprises a bracket pivotally coupled to the frame, one or more bracket rollers rotatably coupled to the bracket, and one or more hold down strips attached to and extending downstream from the bracket, wherein the roller tray and the conveyor belt are configured to direct a wrap film from the drive roller toward a bale.

2. The wrap film feeding assembly of claim 1, wherein a pivot axis of the bracket is aligned with a rotational axis of a first bracket roller of the one or more bracket rollers.

3. The wrap film feeding assembly of claim 1, wherein the conveyor belt is coupled to a film delivery tray, and the film delivery tray is movably coupled to the frame.

4. The wrap film feeding assembly of claim 3, comprising one or more rear hold down strips, wherein the film delivery tray comprises a support bracket, the one or more rear hold down strips are coupled to the support bracket, and the support bracket is coupled to the film delivery tray.

5. The wrap film feeding assembly of claim 4, wherein the film delivery tray is moveable between a retracted position and an extended position relative to the frame.

6. The wrap film feeding assembly of claim 1, comprising an anti-back wrap bracket with one or more protrusions, wherein each of the one or more protrusions is engaged with a respective notch in the drive roller.

7. The wrap film feeding assembly of claim 1, comprising a mounting bar moveable vertically relative to the frame, wherein the roller tray is coupled to the mounting bar.

8. The wrap film feeding assembly of claim 1, wherein the bracket comprises a body and a mount, the one or more hold down strips are attached to the mount, and the mount is pivotally coupled to the body to control an angle of the one or more hold down strips relative to the body.

9. A system comprising:
a frame;
a drive roller rotatably coupled to the frame and config-
ured to convey a wrap film downstream toward a bale;
a belt assembly comprising one or more conveyor belts;
and
one or more roller trays disposed above the belt assembly
downstream from the drive roller, wherein each roller
tray of the one or more roller trays comprises:
a bracket with a downstream end and an upstream end,
wherein the bracket is pivotally coupled to the frame
at the upstream end;
a plurality of bracket rollers rotatably coupled to the
bracket; and
one or more hold down strips extending downstream
from the downstream end of the bracket,
wherein the plurality of bracket rollers is configured to
urge the wrap film against the belt assembly.

10. The system of claim 9, wherein a pivot axis of the
bracket of each roller tray of the one or more roller trays is
aligned with a rotational axis of a first bracket roller of the
plurality of bracket rollers of the roller tray.

11. The system of claim 9, comprising an anti-back wrap
bracket with one or more protrusions, wherein each of the
one or more protrusions is engaged with a respective notch
in the drive roller.

12. The system of claim 9, comprising a mounting bar that
is moveable vertically relative to the frame, wherein the one
or more roller trays are coupled to the mounting bar.

13. The system of claim 9, comprising one or more rear
hold down strips disposed above the belt assembly.

14. The system of claim 9, comprising a film delivery tray
movably coupled to the frame, wherein the film delivery tray
comprises the belt assembly.

15. The system of claim 14, wherein the film delivery tray
is moveable between a retracted position and an extended
position relative to the frame.

16. The system of claim 9, wherein each roller tray of the
one or more roller trays is laterally aligned with a respective
conveyor belt of the one or more conveyor belts of the belt
assembly.

17. A roller tray for a wrap film feeding assembly, the
roller tray comprising:
a bracket with a downstream end and an upstream end,
wherein the upstream end is configured to be pivotally
coupled to a frame of the wrap film feeding assembly,
and the bracket is configured to be disposed above a
conveyor belt of the wrap film feeding assembly;
one or more bracket rollers rotatably coupled to the
bracket, wherein a first bracket roller of the one or more
bracket rollers is positioned at the upstream end of the
bracket; and
one or more hold down strips extending downstream from
the downstream end of the bracket,
wherein the roller tray is configured to receive wrap film
from a drive roller, the one or more bracket rollers are
configured to contact the wrap film to urge the wrap
film toward the conveyor belt, and the one or more hold
down strips are configured to direct the wrap film
toward a bale.

18. The roller tray of claim 17, wherein the bracket
comprises a body and a mount, the one or more hold down
strips are attached to the mount, and the mount is pivotally
coupled to the body to control an angle of the one or more
hold down strips relative to the body.

19. The roller tray of claim 17, wherein a pivot axis of the
bracket is aligned with a rotational axis of the first bracket
roller.

20. The roller tray of claim 17, wherein the first bracket
roller is moveable vertically relative to the frame.

* * * * *